United States Patent [19]

Becht et al.

[11] Patent Number: 4,689,106
[45] Date of Patent: Aug. 25, 1987

[54] TRANSFER RING SPACER SEGMENT

[75] Inventors: Cletus A. Becht; Peter M. Cressman, both of Akron; William J. Head, Ravenna; John R. White, Wadsworth, all of Ohio

[73] Assignee: The Goodyear Tire & Rubber Company, Akron, Ohio

[21] Appl. No.: 721,854

[22] Filed: Apr. 10, 1985

[51] Int. Cl.⁴ ............................................. B29D 30/26
[52] U.S. Cl. .................................. 156/406.2; 156/126
[58] Field of Search ............... 156/126, 128.1, 396, 156/405.1, 406.2; 24/457, 530, 545, 572; 100/211, 296

[56] References Cited

U.S. PATENT DOCUMENTS

| | | | |
|---|---|---|---|
| 3,674,603 | 7/1972 | Leblond | 156/406.2 |
| 3,909,335 | 9/1975 | Jellison | 156/126 X |
| 4,053,342 | 10/1977 | Appleby et al. | 156/126 X |
| 4,105,486 | 8/1978 | Cantarutti | 156/406.2 X |
| 4,148,681 | 4/1979 | Collins et al. | 156/406.2 |
| 4,437,920 | 3/1984 | Kubo | 156/406.2 |
| 4,555,287 | 11/1985 | Goodfellow | 156/406.2 X |
| 4,584,050 | 4/1986 | Kumagai et al. | 156/406.2 |

FOREIGN PATENT DOCUMENTS

| | | | |
|---|---|---|---|
| 2551227 | 5/1977 | Fed. Rep. of Germany | 156/406.2 |
| 7612385 | 11/1976 | Netherlands | 156/406.2 |
| 2092100 | 8/1982 | United Kingdom | 156/406.2 |

Primary Examiner—Donald E. Czaja
Assistant Examiner—Ramon R. Hoch
Attorney, Agent, or Firm—T. P. Lewandowski; Frederick K. Lacher

[57] ABSTRACT

Spacer segments (24) of various thicknesses are attached to radially movable master segments (14) of a transfer ring (16) for gripping and transferring tread belt packages of different diameters. The spacer segments (24) are of a resilient material and may have molded arm members (32) with flexible, resilient ribs (42) for engaging edge portions (46) of the master segments (14). Handles (70) may be provided on the arm members (32) for bending the arm members (32) to install and remove the spacer segments (24). Axial movement of the spacer segments (24) relative to the master segments (14) is limited by circumferentially extending raised edges (58,60,66,68) on the cylindrical mating surfaces (26,28) of the master segments (14) and the spacer segments (24).

20 Claims, 4 Drawing Figures

TRANSFER RING SPACER SEGMENT

This invention relates generally to building radial pneumatic tires and especially to a segmental transfer ring for gripping and transferring an annular belt, tread or belt and tread assembly from a belt building drum to a band building drum where the tire carcass is expanded into engagement with the belt and tread assembly. Spacer segments or shoes of different thicknesses are fastened to the master segments of the transfer ring for gripping belt and tread assemblies of different outside diameters. Heretofore machined aluminum spacers and spacer adapters have been bolted on the master segments. The weight of the spacers and spacer adapters plus the bolting operation has resulted in difficult and lengthy changeover times when adapting the transfer ring to annular belt and tread assemblies of different outside diameters. The relatively heavy aluminum spacer segments and adapters have been cumbersome, and considerable care and effort has been required to mount and change the spacer segments. The cost of machining the metal spacers and spacer adapters has also been high.

In accordance with an aspect of this invention there is provided in combination a transfer ring spacer segment having a concave article-holding surface and a master segment of a segmental, generally cylindrical belt transfer ring, the spacer segment having a mating surface in engagement with a mating surface of the master segment, the spacer segment being of resilient material and having a flexible, resilient connecting portion in retaining engagement with an edge portion of the master segment.

In accordance with another aspect of this invention there is provided a transfer ring spacer segment for attachment to a master segment of a segmental, generally cylindrical belt transfer ring comprising a body of resilient material having a generally concave article holding surface and a mating surface for engagement with a mating surface of the master segment, the spacer segment having a flexible, resilient connecting portion yieldably movable over an edge portion of the master segment into retaining engagement with the edge portion upon positioning of the mating surface of the spacer segment on the mating surface of the master segment.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

Figure 1:
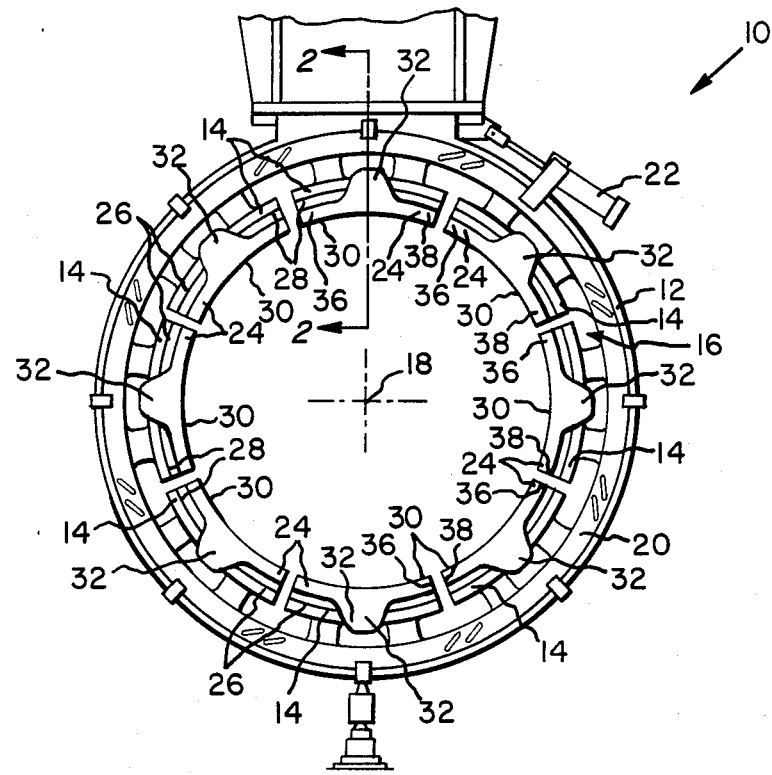
FIG. 1 is an elevation of a transfer ring having radially movable master segments and attached spacer segments embodying the invention.

Referring to the drawings and especially to FIG. 1, a portion of a belt transfer carrier 10 is shown which may be slidably supported on bars or other suitable supports for movement between a position concentric with a belt building drum and a position concentric with a band building drum. A rigid ring 12 is affixed to the carrier 10 to support a belt transfer ring 16 which may also be used for a tread or a tread and belt assembly. The master segments 14 are supported coaxially of a transfer ring axis 18 and are moved radially thereof by a mechanism including an actuating ring 20 carried by ring 12 for coaxial rotation in response to operation of an air cylinder 22 to move the master segments 14 inwardly and outwardly with respect to the transfer ring axis. The iris mechanism shown in FIG. 1 is well known and outside the scope of the present invention.

Figure 2:
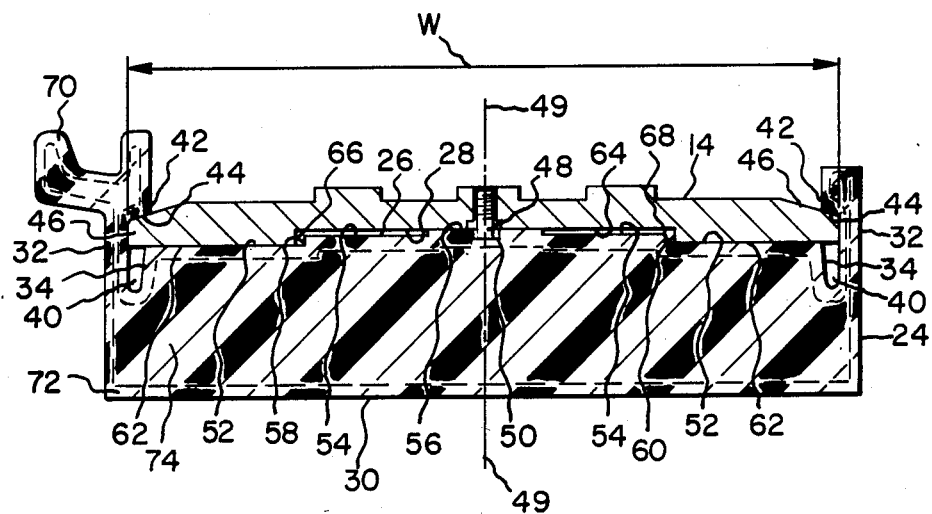
FIG. 2 is an enlarged sectional view of the master segment and spacer segment taken along the line 2—2 in FIG. 1.
Figure 4:
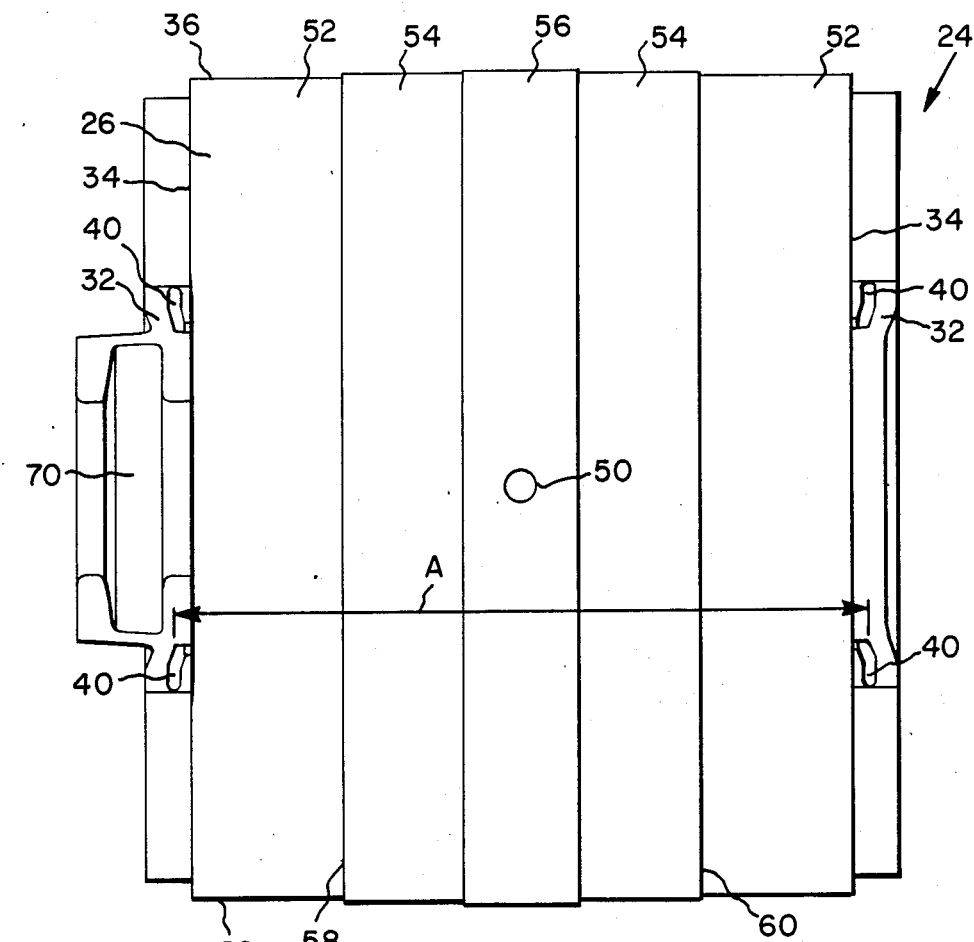
FIG. 4 is a plan view of the spacer segment showing the mating surface.

Referring to FIGS. 1, 2 and 4, each of the master segments 14 supports a transfer ring spacer segment 24 having a generally convex mating surface 26 in engagement with a generally concave mating surface 28 of the master segment. The spacer segment 24 is formed as by molding of a body of resilient material such as reaction injection moldable urethane and has a generally concave article-holding surface 30.

The spacer segment 24 has a flexible, resilient connecting portion such as a radially extending arm member 32 which may be located adjacent a circumferentially extending edge 34 of the spacer segment. As shown in FIGS. 1 and 4, the arm member 32 is located halfway between end portions 36 and 38. The arm member 32 may be spaced from the circumferentially extending edge 34 of the spacer segment 24 providing a groove 40 increasing the flexibility of the arm member.

Gripping means such as an axially extending rib 42 is provided on the arm 32 having a rib surface 44 in engagement with an edge portion such as circumferentially extending chamfered edge 46 on each side of each of the master segments 14. Preferably the distance between the mating surface 26 of the spacer segment 24 and the rib surface 44 of the arm member 32 is less than the distance between the mating surface 28 and the edge 46 of each of the master segments 14 in the unmounted condition of the spacer segment, shown in FIG. 3, so that in the mounted condition, shown in FIG. 2, each arm member will be stretched and stressed in tension.

Referring to FIGS. 2 and 4, the width W of each of the master segments 14 is greater than the distance A between the arm members 32 in the unmounted condition of the spacer segment 24 so that in the mounted condition the arm members are biased against the edges 46 of the master segments. The resiliency of each arm member 32 urges each spacer segment edge 34 toward a circumferential midplane 49 of the master segments 14 to center the spacer segment 24 on each of the master segments.

Circumferential movement of each spacer segment 24 relative to each of the master segments 14 is limited by a pin 48 mounted on and projecting from the mating surface 28 of each of the master segments. The mating surface 26 of each spacer segment 24 has a matching opening or hole 50 for receiving the pin 48.

Axial movement of each spacer segment 24 relative to each of the master segments 14 is controlled by movement-limiting means such as circumferentially extending cylindrical side surfaces 52, intermediate surfaces 54 and center surface 56 in the mating surface 26 of the spacer segment. The circumferentially extending cylindrical surfaces 52, 54 and 56 are in side-by-side relationship and have different diameters to provide circumferentially extending raised edges 58 and 60. The mating surface 28 of each of the master segments 14 has circumferentially extending cylindrical side surfaces 62 and a circumferentially extending cylindrical center surface 64 in side-by-side relationship and of different diameters to provide circumferentially raised edges 66 and 68. The raised edges 58 and 60 are positioned adjacent the raised edges 66 and 68 to limit relative axial movement of each spacer segment 24 and each of the master segments 14 when the mating surfaces 26 and 28 of each spacer segment and each of the master segments are in engagement. Clearance of about 0.03 inches (0.076 cm) between the raised edges 58 and 60 of each spacer segment 24 and the raised edges 66 and 68 of each of the master segments 14 is desirable to facilitate mounting of the spacer segment on the master segment. The arm member 32 on one side of each spacer segment 24 may have a handle 70 extending axially outward from the arm member for pulling the arm member away from the circumferentially extending chamfered edge 46 of each of the master segments 14.

Figure 3:
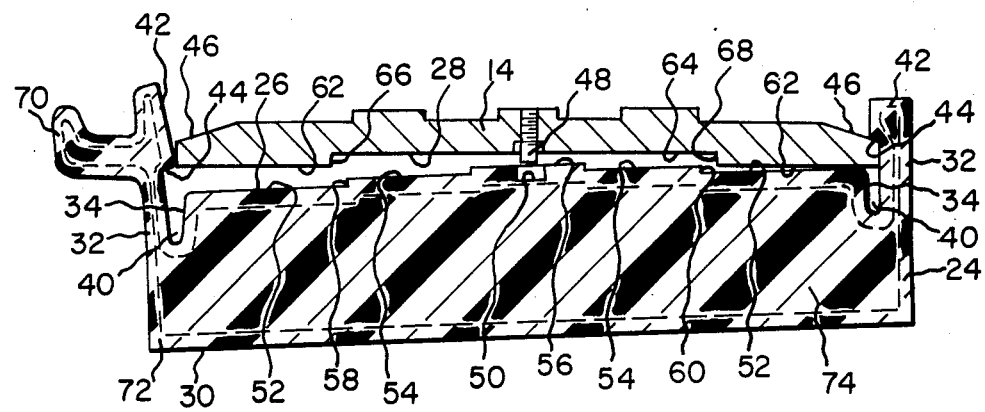
FIG. 3 is an enlarged sectional view like FIG. 2 showing the position of the spacer segment arm members during installation on or removal from the master segment.

Referring to FIG. 3, the spacer segment 24 is shown in position for mounting on one of the master segments 14. The rib surface 44 of the rib 42 on the arm member 32 is hooked over the chamfered edge 46 of the master segment 14 at the right-hand side of the spacer segment as shown in FIG. 3. The arm member 32 at the left-hand side of the spacer segment 24 is bent away from the left edge 46 of the master segment by grasping the handle 70 and pulling it toward the left as shown in Fig 3. At the same time the operator may push against the article-holding surface 30 to urge the spacer segment 24 toward the master segment until the mating surfaces 26 and 28 are in contact. The rib 42 on the arm member 32, at the left-hand side of FIG. 3, then snaps over the chamfered edge 46 of the master segment 14 and holds the spacer segment 24 on the master segment. It is also contemplated that the spacer segment 24 may have a handle 70 on both of the arm members 32 so that both arm members may be spread apart simultaneously to snap both the ribs 42 over the chamfered edges 46 at the same time.

To remove the spacer segment 24 from the master segment 14, the operator grasps the handle 70 on the spacer segment, as shown in FIG. 2, and pulls the handle to the left away from the left-hand edge 46 of the master segment. When the left-hand rib surface 44 is disengaged from the edge 46, the operator pulls the handle 70 downward, as shown in FIG. 3, to a position where the spacer segment 24 can be moved to the right and the right-hand rib surface 44 moved off the right-hand edge 46 of the master segment 14. The spacer segment 24 is then completely disengaged from the master segment 14 and can be carried to a storage area.

The spacer segment 24 is molded of a reaction injection moldable urethane with a high density surface layer 72 and a relatively low density interior 74 to provide a tough, high strength, microcellular material at the surface and a relatively light, microcellular material at the interior of the spacer segment. With this construction, the arm members 32, rib 42 and handle 70 are of such a thin cross section the surface layer 72 makes up substantially all of these parts and therefore they are molded almost completely of high density material. This gives these parts the high strength which is needed for holding the spacer segment 24 on the master segment 14 and also the wear resistance which is needed at the surface. A method of producing a spacer segment 24 of this construction may include adding a blowing agent such as fluorocarbon to the resin premix and then placing the reactant materials (resin premix and isocyanate) in a mold where it is molded to the shape shown in FIGS. 2 and 4 with the surface layer 72 of high density material and the interior of low density material.

Reaction injection moldable urethane materials which are suitable for the spacer segment 24 of this invention may have the following properties: Tensile strength of from about 3,795 psi (266.8 kg/cm$^2$) to about 4,817 psi (338.67 kg/cm$^2$); Elongation of from about 28 percent to about 78 percent; Flexural strength of from about 487 psi (34.2 kg/cm$^2$) to about 724 psi (50.9 kg/cm$^2$) and Flexural modulus of from about 9,466 psi (665.5 kg/cm$^2$) to about 15,577 psi (1095.2 kg/cm$^2$).

With the spacer segment 24 of this invention, it has been found that the changeover time for replacing the spacer segments with spacer segments of a different thickness on the transfer ring 16 has been reduced from about nine minutes to one minute. No fasteners such as bolts are required and the weight of the spacer segment 24 has been reduced appreciably due to the reduction in specific gravity of from 2.7 for aluminum to a specific gravity of from 1.0 to 0.3 and preferably 0.4 for urethane. This is important for handling and storage. Also whereas two aluminum units, a spacer and spacer adapter have been required heretofore, only one urethane spacer segment is now required to achieve the desired shoulder tire diameter.

What is claimed is:

1. In combination a transfer ring spacer segment having a concave article-holding surface and a master segment of a segmental, generally cylindrical belt transfer ring having an axis, said master segment having circumferentially extending edge portions at spaced-apart positions axially of said belt transfer ring, said spacer segment having end portions at spaced-apart positions circumferentially of said belt transfer ring and circumferentially extending spacer edge portions at spaced-apart positions axially of said belt transfer ring, said spacer segment having a mating surface in engagement with a mating surface of said master segment, said spacer segment being of resilient material and having at least one flexible, resilient radially extending arm member, said arm member having gripping means in engagement with one of said circumferentially extending edge portions of said master segment and said arm member being positioned at one of said spacer edge portions and spaced circumferentially from said end portions.

2. The combination of claim 1 wherein said mating surface of said master segment has a concave curvature and said mating surface of said spacer segment has a convex curvature.

3. The combination of claim 1 wherein said gripping means includes an axially extending rib with a rib surface in engagement with said edge portion of said master segment.

4. The combination of claim 3 wherein the distance between said mating surface of said spacer segment and said rib surface of said arm member in the unmounted condition of said spacer segment is less than the distance between said mating surface and said edge portion of said master segment so that said arm member is stressed in tension.

5. The combination of claim 1 wherein said flexible, resilient radially extending arm member is located generally halfway between said end portions, said mating surface of said spacer segment having movement-limiting means, and said mating surface of said master segment having movementlimiting means adjacent said movement-limiting means of said spacer segment to limit movement of said spacer segment relative to said master segment.

6. The combination of claim 5 wherein said movement-limiting means includes an opening in said spacer segment containing a pin mounted on said master segment.

7. The combination of claim 5 wherein said movement-limiting means comprises circumferentially extending raised edges on said mating surface of said spacer segment adjacent circumferentially extending raised edges on said mating surface of said master segment.

8. The combination of claim 7 wherein said mating surfaces of said spacer segment and said master segment have circumferentially extending cylindrical surfaces of different diameters in side-by-side relationship and said circumferentially extending raised edges are the edges of said circumferentially extending cylindrical surfaces.

9. The combination of claim 1 wherein said arm member is located adjacent a first one of said circumferentially extending spacer edge portions of said spacer segment, a second radially extending arm member is located adjacent a second one of said circumferentially extending spacer edge portions of said spacer segment and said second radially extending arm member has a second gripping means in engagement with a second one of said circumferentially extending edge portions of said master segment.

10. The combination of claim 9 wherein said arm member has a handle extending axially outward from said arm member for pulling said arm member away from said first one of said circumferentially extending edge portions of said master segment to install and remove said spacer segment.

11. The combination of claim 9 wherein said arm member is spaced from said first one of said circumferentially extending spacer edge portions of said spacer segment to provide a groove between the edge portion and said arm member and increase the flexibility of said arm member for facilitating installation and removal of said spacer segment.

12. The combination of claim 9 wherein the width of said master segment is greater than the distance between said arm member and said second radially extending arm member in the unmounted condition of said spacer segments so that in the mounted condition the arm members are biased against the edges of said master segment.

13. A transfer ring spacer segment for attachment to a master segment of a segmental, generally cylindrical belt transfer ring having an axis comprising a body of resilient material having a generally concave article-holding surface and a mating surface for engagement with a mating surface of said master segment, said spacer segment having end portions at spaced-apart positions circumferentially of said belt transfer ring and circumferentially extending spacer edge portions at spaced-apart positions axially of said belt transfer ring, a flexible, resilient, radially extending arm member positioned on said spacer segment at one of said spacer edge portions and spaced circumferentially from said end portions, said arm member having a gripping means for engagement with an edge portion of said master segment upon mounting of said spacer segment on said master segment.

14. A transfer ring spacer segment according to claim 13 further comprising a handle extending axially outward from said arm member for pulling said arm member away from said edge portion of said master segment to install and remove said spacer segment.

15. A transfer ring spacer segment according to claim 13 wherein said body of resilient material is of a reaction injection moldable urethane having a high strength, high density, microcellular surface layer and a lightweight, low density, microcellular interior.

16. A transfer ring spacer segment according to claim 15 wherein said arm member and said gripping means have relatively thin cross sections and said surface layer of high strength, high density, microcellular material makes up substantially all of said arm member and said gripping means to provide high strength and wear resistance.

17. A transfer ring spacer segment according to claim 15 wherein said urethane material has a tensile strength of from about 3,795 psi (266.8 kg/cm$^2$) to about 4,817 psi (338.67 kg/cm$^2$), and an elongation of from about 28 percent to about 78 percent.

18. A transfer ring spacer segment according to claim 17 wherein said urethane material has a Flexural strength of from about 487 psi (34.2 kg/cm$^2$) to about 724 psi (50.9 kg/cm$^2$) and a Flexural modulus of from about 9,466 psi (665.5 kg/cm$^2$) to about 15,577 psi (1,095.2 kg/cm$^2$).

19. A transfer ring spacer segment for attachment to a master segment of a segmental, generally cylindrical belt transfer ring having an axis comprising a body of resilient material having a generally concave article-holding surface and a mating surface for engagement with a mating surface of said master segment, said spacer segment having end portions at spaced-apart positions circumferentially of said belt transfer ring, a flexible, resilient, radially extending arm member on said spacer segment located generally halfway between said end portions, said arm member having a gripping means for engagement with an edge portion of said master segment upon mounting of said spacer segment on said master segment, and said mating surface of said spacer segment having movement-limiting means for positioning adjacent movement-limiting means on said mating surface of said master segment to limit movement of said spacer segment relative to said master segment.

20. A transfer ring spacer segment according to claim 19 wherein said movement-limiting means comprises circumferentially extending cylindrical surfaces of different diameters in side-by-side relationship, providing circumferentially extending raised edges for positioning adjacent circumferentially extending raised edges on said mating surface of said master segment.

* * * * *